United States Patent [19]

Brown, Jr.

[11] 4,340,495

[45] Jul. 20, 1982

[54] ALKYL SILOXANE ALKOXY SILOXANE COPOLYMERIC HYDRAULIC FLUIDS

[75] Inventor: Edgar D. Brown, Jr., Schenectady, N.Y.

[73] Assignee: General Electric Company, Waterford, N.Y.

[21] Appl. No.: 137,339

[22] Filed: Apr. 4, 1980

[51] Int. Cl.$^3$ .......................... C10M 3/46; C10M 3/44
[52] U.S. Cl. .................................................. 252/78.3
[58] Field of Search ........................................ 252/78.3

[56] References Cited

U.S. PATENT DOCUMENTS

| | | | |
|---|---|---|---|
| 3,833,505 | 9/1974 | Brown | 252/78.3 X |
| 4,056,546 | 11/1977 | Brown | 252/78.3 X |
| 4,137,189 | 1/1979 | Holbrook et al. | 252/78.3 X |
| 4,155,864 | 5/1979 | Martin | 252/78.3 X |
| 4,261,848 | 4/1981 | Reedy et al. | 252/78.3 |

*Primary Examiner*—P. E. Willis, Jr.
*Attorney, Agent, or Firm*—Michael J. Doyle

[57] ABSTRACT

The present invention provides a silicone hydraulic fluid which is particularly useful as an automotive brake fluid which is comprised of a polysiloxane base fluid having specified amounts of mono-, di-, and tri- functionality; which is combined with a hydrocarbonoxy functional silicone additive which provides advantageous low temperature characteristics. Other optional brake fluid additives can also be utilized.

15 Claims, No Drawings

ALKYL SILOXANE ALKOXY SILOXANE COPOLYMERIC HYDRAULIC FLUIDS

BACKGROUND OF THE INVENTION

The present invention relates to silicone polymer fluids which are useful as hydraulic fluids and more particularly the present invention relates to silicone polymer fluids wherein an MDT type silicone base fluid is combined with an alkyl siloxane-alkoxy siloxane copolymer which has polymeric units exhibiting difunctionality and/or trifunctionality.

Most brake fluids which are presently sold are glycol based polyethers which vary according to the type and number of polyether units in the polymer chain. Although such brake fluids have found wide acceptance for use in vehicles such as automobiles, such glycol based fluids have various disadvantages. Automobile manufacturers have sought to obtain a better quality of brake fluid which would also provide a higher factor of safety.

One of the disadvantages of the glycol based polyether brake fluids is the rather limited high temperature stability of such compositions. Thus, it has been found that at some temperatures to which the brake system of an automobile may conceivably be exposed, these brake fluids may degrade or evaporate. It has also been found that at such high temperatures these brake fluids may possibly vaporize, thereby causing spontaneous brake failure. Thus, the brake fluids presently on the market tend to have an undesirable low boiling point.

Another disadvantage of the glycol based polyether brake fluids presently on the market is that they are hygroscopic, that is, such fluids tend to pick up water and moisture from the air quite easily. Although such glycol based polyether brake fluids have the property of being compatible with large amounts of water, nevertheless, due to their hygroscopicity they will over a period of time absorb a large amount of moisture into the system, such that when the compatibility level of the water in the polyether glycol based fluid is exceeded the water will cause undesirable changes in the physical properties of the brake fluid. At low temperatures such large amounts of absorbed water in the polyether glycol based brake fluid will undesirably increase the viscosity of the brake fluid and deleteriously affect the performance of the brakes. At high temperatures the presence of large amounts of water may result in the water being vaporized to create what is known as vapor-lock in the hydraulic lines of the brake system, which also results in improper performance of the brakes.

To overcome these disadvantages of the presently available brake fluids, manufacturers have sought other types of fluids which would have a higher performance factor in automobile brake systems, and which avoid the disadvantages of the glycol based polyether brake fluids mentioned above.

Several silicone fluids have been proposed for use as brake fluids. Silicone fluids have the particular advantage of a very high flash point and do not degrade at high temperatures thus retaining their chemical stability. In addition, silicone fluids also have a high fire point. Even during periods of exceptional stress in the operation of the hydraulic brake system of an automobile the temperature reached in the hydraulic system is considerably below the flash point and fire point of such silicone fluids. Additionally, silicone fluids advantageously exhibit a desirably small viscosity at low temperatures, even at temperatures as low as −40° C. Furthermore, most silicone fluids are not hygroscopic and take up very little water or moisture from the air and are not ordinarily associated with problems of excessive water absorption. However, since water may conceivably enter the system by accident or some other means, it is desirable that a silicone fluid be compatible with a reasonable amount of water. Thus, silicone hydraulic fluids can be modified in order to be compatible with reasonable amounts of water.

In addition, it is desirable to obtain a silicone fluid which has a pourable viscosity at low temperatures and yet has a minimum viscosity high operating temperature.

The necessity for a low viscosity of the brake fluid at low temperatures is so that such a fluid can be used in very cold climates and even in the arctic regions.

In addition, it is desired that the silicone fluid that is to be used as a brake fluid be compatible with the common brake fluids presently on the market, that is, the glycol based polyether fluids. Thus, if by accident some non-silicone brake fluid enters the system or if silicone fluid is added by accident to a hydraulic braking system to replace some glycol based polyether fluid, then it is desirable that the silicone fluid be compatible with the glycol based polyether fluid.

While the above discussion has been directed to the use of a silicone polymer as a brake fluid, it should be mentioned that a silicone fluid having the above-named advantages over glycol based polyether fluids would be a superior hydraulic fluid for use in hydraulic systems. Such a hydraulic system may or may not include a hydraulic reservoir; it would include a mechanical hydraulic activating means which may for instance be a brake pedal to which mechanical pressure is applied; and it would also include a hydraulic activated means which may be the pistons or other types of mechanisms that are activated by the hydraulic pressure in the brake drum shoe or disc brake or other type of hydraulic system assembly. The hydraulic activating means, hydraulic activated means and hydraulic reservoir are all connected by the necessary hydraulic lines. Thus, it is not intended to limit the application of the novel silicone polymer fluid disclosed in this application solely for use in brake hydraulic systems but such a fluid may be used in all types of known hydraulic systems and would have the superior advantages and properties of silicone fluids as well as the specific advantages mentioned above.

Accordingly, it is one object of the present invention to provide a novel silicone polymer fluid which is useful as a hydraulic fluid.

Another object is to provide a silicone hydraulic fluid which is particularly effective for use in automotive braking systems.

Another object is to provide a silicone brake fluid which is primarily a methylsiloxane base fluid exhibiting mono-, di-, and tri-functional polymeric units, which is combined with an alkoxy functional siloxane copolymer.

Another object is to provide a silicone brake fluid which incorporates rubber swell, anti-oxidant, and anti-corrosive additives as well as dyes for color.

Another object is to provide a process for producing the abovedescribed silicone brake fluids.

Another object is to provide a hydraulic system utilizing such silicone brake fluids.

These and other objects will become apparent to one skilled in the art upon consideration of the following detailed specification.

SUMMARY OF THE INVENTION

The silicone hydraulic fluid of the present invention is comprised of a mixture of (a) 100 parts by weight of a silicone base polymer having, approximately 3 to 20 mole percent of mono-functional polymeric units having the formula $R_3SiO_{\frac{1}{2}}$, 1.5 to 20 mole percent of tri-functional polymeric units having the formula $RSiO_{1.5}$, and the remainder or 60 to 95 mole percent of difunctional polymeric units having the formula $R_2SiO$, and a viscosity of approximately 1 to 200 centistokes at 25° C. Preferably, the base polymer will have, approximately, 10 to 15 mole percent monofunctionality and 2 to 6 mole percent trifunctionality. R ordinarily represents methyl and ethyl radicals.

The silicone base polymer is combined with, approximately, 0.5 to 5.0 weight percent of (b) a dialkylalkoxysilyl chain-stopped polydialkylsiloxane fluid having 10 to 60 mole percent of polymeric units having the formula

and 40 to 90 mole percent $R_2SiO$ units and having a viscosity of, approximately, 10 to 50 centistokes at 25° C.

In these formulas, R represents the same or different monovalent hydrocarbon radical, M is selected from the class consisting of R—, ROR'—, ROR'OR'—, $R(OC_xH_{2x})_n$—, and

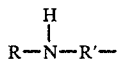

such that R is as previously described, R' is selected from the class consisting of alkylene and arylene radicals having up to 20 carbon atoms, x varies from 2 to 4 and n varies from 4 to 100.

The alkoxy stopped fluid may alternatively be further comprised of up to 25 mole percent of polymeric units selected from the class consisting of

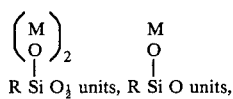

and R Si $O_{3/2}$ units and mixtures thereof, and having a viscosity of approximately 2 to 400 centistokes at 25° C. A particularly useful alkoxy chain-stopped siloxane fluid is dimethyl-methoxy triglycol chain-stopped polydimethylsiloxane.

The silicone brake fluid can also contain, approximately, 2 to 15 parts by weight of a rubber swell additive or mixture of such additives. Examples of such additives are tributyl phosphate and dioctyl azelate which can each be present in amounts of approximately 1.0 and 7.5 parts by weight, either alone or in combination for particularly effective results.

Dyes can be added to change the color of the brake fluid. These are sometimes necessary because military or manufacturer's specification often call for particular colors for differing grades of these hydraulic fluids. This is usually done to avoid mix-ups. For example, the silicone brake fluid of the present invention can be rendered purple in color upon the addition of small effective amounts of dyes known by the tradenames Oil Violet IRS and Perox red. Amounts of less than 1% of these dyes are more than sufficient to color these fluids.

The above silicone fluid mixture, irrespective of its form, has been found to be especially suitable for use as a brake fluid. However, it is not intended to limit the application in the present specification of the silicone fluid mixture defined above to use just in the hydraulic system to an automobile or other type of vehicle. More broadly, the silicone fluid mixture of the present invention is directed to a suitable use as a hydraulic fluid in any hydraulic system. In the more specific preferred embodiment of the present invention the silicone fluid mixture defined above, with or without the various additives, is particularly suitable for use in the hydraulic brake system of an automobile, truck or other such type of vehicle. Such an automotive vehicle will contain as part of its brake system a hydraulic reservoir, a brake drum cylinder with the necessary pistons therein or the comparable equipment to be found in a disc brake system and in addition, the necessary pistons and connecting links by which the operator of the vehicle applies mechanical pressure which is transferred into hydraulic pressure. The reservoir, brake drum, cylinder, pistons, as well as the equivalent disc brake appendages and the mechanical force applying equipment are all connected by the necessary hydraulic lines and other types of supplementary equipment.

To generally describe such a hydraulic brake system, in all types of vehicles irrespective of the type of vehicle, reference will simply be made to a hydraulic reservoir; to the hydraulic activating means which is the mechanical means by which an operator of a vehicle translates his physical pressure, that is, the brake pedal and the piston which it activates; to hydraulic activated means which will refer to the brake drum cylinder and the pistons therein or the equivalent disc brake system; and to hydraulic lines, that is, the hydraulic lines, connecting all of these parts of the hydraulic brake system together. Since the purpose of the present application is not to define or describe a novel type of brake system or a novel type of hydraulic system per se, the different types of brake systems and hydraulic systems will not be described herein in detail since the direction of the present application is to describe a novel hydraulic fluid and, more preferably, a novel hydraulic fluid as used in a hydraulic brake system.

DESCRIPTION OF THE PREFERRED EMBODIMENT

The radical R appearing in the above formulas is well-known in the art; is typified by the radicals usually associated with silicon bonded organic groups in the case of R; and generally associated with divalent hydrocarbon radicals in the case of R'. The organic radicals represented by R include monovalent hydrocarbon radicals, halogenated monovalent hydrocarbon radicals and cyanoalkyl radicals. Thus, the radical R may be alkyl, such as methyl, ethyl, propyl, butyl, octyl; aryl radicals, such as phenyl, tolyl, xylyl, naphthyl radicals; aralkyl radicals, such as, benzyl, phenylethyl radicals;

olefinically unsaturated monovalent hydrocarbon radicals, such as vinyl, allyl, cyclohexyl radicals, cycloalkyl radicals, such as cyclohexyl, cycloheptyl, etc.; halogenated monovalent hydrocarbon radicals, such as chloromethyl, dichloropropyl, 1,1-trifluoropropyl, chlorophenyl, dibromophenyl and other such radicals; cyanoalkyl radicals, such as cyanoethyl, cyanopropyl, etc. The various R radicals attached to the silicon atom may be the same or different. Thus, all the R radicals attached to the silicon atom may be lower alkyl, that is, having 1 to 8 carbon atoms or a mixture of various types of lower alkyl radicals or a mixture of lower alkyl radicals with the other types of radicals defined above for the R group. Preferably, the R radicals attached to the silicon atoms are selected from lower alkyl radicals having 1 to 8 carbon atoms and more preferably, methyl. The R radicals in the M groups may be the same as the R radicals attached to the silicon atoms or may be different. Preferably, the R radicals in the M groups are lower alkyl radicals of 1 to 8 carbon atoms such as, methyl.

The radicals represented by R' may be any alkylene or arylene radicals of up to 20 carbon atoms and more preferably of 1 to 10 carbon atoms such as, methylene, ethylene, various isomers of the phenylene radicals of substituted propylene, phenylene radicals. In the preferred embodiment, R' is ethylene.

It should be noted that in a particular M group as defined above, if there is more than one R' radical, the R' radical may be the same or may be different.

In the case where the M is a polyether group, the R radical is preferably butyl, and alkyl radical of 1 to 4 carbon atoms and more preferably methyl. In addition, x is preferably 2 or 3 and n varies from 5 to 100.

The silicone hydraulic fluid of the present invention is comprised primarily of a silicone polymer base fluid which is also known as an MDT fluid. The designation MDT denotes a siloxane having mono-, di-, and tri-functional polymeric units. Varying the degree of M, D, and T functionality in the polymer will provide silicone base fluids having desirable properties for use in a brake fluid compositions. As mentioned above, ordinarily there will be up to 20 mole percent each of mono- and tri-units. In effect, the polymer fluid is a branched chain siloxane. For a description of such branched chain fluids, see for example U.S. Pat. No. 4,005,023 issued Jan. 25, 1977 to Brown et al, which is hereby incorporated by reference.

These MDT fluids can generally be prepared by hydrolysis procedures in much the same manner as linear polysiloxanes are prepared. A typical hydrolysis procedure would preferably utilize a mixture containing 80 to 90 mole percent of $R_2SiX_2$, 5 to 10 mole percent of $R_3SiX$ and 4 to 10 mole percent of $RSiX_3$ where X is halogen and preferably chlorine and R is as previously defined. By using these proportions of organohalosilanes it is possible to obtain a silicone fluid having a desired number of silicon atoms and the resulting silicone fluid will have a desirable viscosity of less than approximately 100 centistokes at 25° C.

For the hydrolysis, one part of the organohalosilane mixture is added to 3 to 6 parts of water. It is preferable to utilize an excess of water so as to hydrolyze all of the halogen present which thereby ensures that the correct proportions of siloxane bonds will be formed in the polymer. Although the reaction can be carried out at room temperature, it is preferable to react the organohalosilanes with the water at a temperature of 40° to 70° C. so as to carry out the reaction as efficiently as possible. Preferably, the addition of the organohalosilanes to the water is carried out in a period of ½ hour to 2 hours with agitation. A solvent is not desirable in this hydrolysis reaction. Common inert organic solvents such as xylene or toluene, results in the formation of undesirable cyclics.

After the addition of the organohalosilanes to the water is completed in a period which may take as much as 4 hours, the mixture is allowed to stand whereupon there forms a silicone polymer layer and a water layer. The water is decanted or drained off and there is added to the silicone polymer layer an equal volume or more of water is agitated with the silicone polymer layer so as to dissolve the hydrogen chloride that may be dissolved in the silicone polymer layer. The wash water is then drained off and the washing procedure is again repeated with additional water. Although most of the hydrogen chloride that is formed during the hydrolysis reaction is given off as a gas, a portion of this by-product is entrapped in the silicone polymer layer. Thus, washing with water is needed to remove this entrapped hydrogen chloride. It is undesirable to have more than 10 parts per million of hydrogen chloride in the final silicone polymer, since the presence of such hydrogen chloride degrades the branch chained silicone fluid and such degradation results when the branch chained silicone fluid is exposed to elevated temperatures.

After the washing is completed, there is added to the branch chained silicone fluid layer small amounts of any common base so as to neutralize any additional hydrogen chloride that may still be left in the silicone fluid layer. Such a base may be sodium hydroxide, potassium hydroxide or a weak base such as, sodium bicarbonate which is preferred. After the addition of the base, the salts that are formed are removed from the silicone fluid by filtering the silicone fluid through a common clay or diatomaceous earth filter. At this point, the silicone fluid may be used as is in the present invention. Preferably, the branch chained silicone fluid is equilibrated in the presence of 5 to 15 parts per million of a strong base or a strong acid at a temperature in the range of 170° to 200° C. so as to produce a large number of polymer molecules having a certain average number of silicon atoms. Thus, preferably there is added to the branch chained silicone fluid 5 to 15 parts per million of an acid-treated clay such as, acid-treated Fuller's Earth and the resulting mixture is heated to the temperature range indicated above for a period of 2 to 4 hours. At the end of that time, if the catalyst that was used was Fuller's Earth such as catalyst may be filtered out.

In the event that there was used another type of catalyst such as, potassium hydroxide, sodium hydroxide, toluene sulfonic acid or other type of a strong base or strong acid, then the catalyst in the equilibrated silicone fluid is neutralized with a base or acid as the case may be.

After the neutralization procedure, the branch chained silicone fluid is cooled to room temperature and the salt impurities that are in the fluid are filtered out by filtering the fluid through a common clay or diatomaceous earth filter. Then the fluid is heated to a temperature above 200° C. and more preferably at a temperature at 280° C. or above to strip out most of the cyclics that were formed during the hydrolyzation procedure and particularly during the equilibration procedure. The cyclics are undesirable in the final product since the presence of such cyclics lowers the boiling point of the silicone fluid. After the stripping procedure which is carried out for a period of 1 to 4 hours, the fluid is cooled to room temperature and is ready to be used as the silicone base polymer of the present invention. Generally, such a branch chained silicone fluid has a viscosity of 5 to 100 centistokes at 25° C. and there may be in any polymer molecule in such a fluid from 10 to 1000 silicon atoms in the polymer chain.

The silicone base polymer described above could in fact be used as an hydraulic fluid by itself, however, extremely advantageous results can be achieved when 100 parts by weight of the base polymer is combined with up to 5 parts by weight of a dialkylalkoxysilyl chain-stopped polydialkylsiloxane copolymer fluid. For a description of these copolymers, see for example U.S. Pat. No. 4,056,546 issued to Brown on Nov. 1, 1977 and which is hereby incorporated by reference.

This copolymer fluid is also produced by the hydrolysis of organohalosilanes. A preferred reaction mixture consists of 75 to 95 mole percent of $R_2SiX$ and 5 to 25 mole percent of $RSiX_3$. The most preferred reaction mixture utilizes 85 weight percent $R_2SiX_2$ and 15 weight percent $RSiX_3$. Thus, the preferred reaction mixture does not contain appreciable amounts of $SiX_4$ and $R_3SiX$. A sufficient amount of water is added so as to hydrolyze at least 25 mole percent of the chlorine or other halogen. Preferably, 50 to 85 mole percent of the halogen will be hydrolyzed. Generally, there is added up to approximately 3.5 moles of water per mole of the organohalosilane mixture. The water is added slowly to the silanes with agitation so as to obtain uniform mixing of the water in the silanes and to obtain proper hydrolysis of the silanes. Although the reaction is exothermic, the evaporation and evolution of hydrogen chloride that is formed will normally reduce the temperature of the reaction in the range of 0° to 20° C. and more preferably 0° to 10° C. It is preferred to maintain the temperature of reaction during the addition of the water to the organohalosilanes below 20° C. and more preferably below 10° C. to prevent the organohalosilanes from being evaporated off from the reaction mixture.

The resulting hydrolyzate is a silicone polymer fluid with a certain number of chlorine atoms substituents on the silicon atoms depending on the amount of water that is added during the hydrolysis. A solution of this hydrolyzate is obtained by adding to the hydrolyzate one of the well-known water-immiscible organic solvents which is inert to the chlorine atoms in the hydrolyzate. Such a water-immiscible organic solvent may be for instance, toluene, xylene, benzene, octane, heptane, cyclohexane and etc. The resulting solution is then heated to a temperature in the area of 25° to 100° C. and more preferably 25°–50° C., at which point the hydrolysis is substantially completed, and the hydrolyzate is in solution in the organic solvent.

At this point the chlorine atoms in the hydrolyzate may be substituted by condensing the hydrolyzate with an alcohol. Examples of alcohols that may be used are ROH, ROR′OH, ROR′OR′OH, $R(OC_xH_{2x})_n$OH and

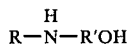

where R and R′ is as previously defined. The most preferred alcohol that may be used is 2-methoxy-2-ethoxy ethylene or higher. It has been found that this alcohol results in a brake fluid additive which is very compatible with presently available glycol based polyether brake fluids. The polyether substituent group and the amine substituent group may also be used to provide silicone hydraulic fluids which are highly compatible with glycol based polyether brake fluids. In addition, the amine substituent group buffers the silicone fluid and results in the silicone fluid being slightly basic which is sometimes desirable in a hydraulic fluid.

Preferably, there can be used the stoichiometric amount of the alcohol necessary to react with the chlorine atoms. Preferably, to have complete condensation of the alcohol groups of substitution of the alcohol groups for the chlorine atoms, it is desired to use at least 10 weight percent excess of the alcohol reactants disclosed above.

The alcohol is simply added to the solution of the silicone polymer fluid and the water-immiscible organic solvent with the necessary amount of agitation. Preferably, this reaction is carried out at a temperature in the range of 25° to 100° C. and more preferably in the temperature range of 25° to 50° C. so that the hydrogen chloride that is formed may easily be evolved from the reaction mixture. This reaction takes place anywhere from 30 minutes to 4 hours. It should be noted that the hydrolysis portion of the reaction usually takes place in 1 hour to 4 hours, depending on the amount of water that is added to the organohalosilanes or the halosilanes. After the alcohol has been added in the time period mentioned above and condensation allowed to proceed in a temperature range of 25° to 50° C., the reaction mixture is heated to the reflux temperature of the water-immiscible organic solvent which may be anywhere from 100° to 180° C., and then all the solvent from the polymer product as well as any excess alcohol and any remaining hydrogen chloride is stripped off under vacuum. In addition to stripping off the water-immiscible organic solvent, the excess alcohol and any remaining hydrogen chloride, it is also necessary to strip off any cyclic siloxanes that have been formed in the process since such cyclic siloxanes are undesirable in the silicone hydraulic fluid since their presence tends to decrease the compatibility of the fluid with other hydraulic fluids. This stripping procedure usually takes from 1 to 4 hours. In addition, the silicone polymer fluid may be heated to 185° C. for a period of 5 to 10 minutes to remove some of the disiloxanes that may have been formed. A large quantity of such disiloxanes is undesirable in the silicone polymer fluid of the present invention, particularly when the silicone polymer fluid is to be used as a brake fluid. The presence of such disiloxanes in the silicone polymer fluid of the present invention undesirably affects the boiling point of the fluid and results in volatiles being given off at high temperatures. However, all the disiloxanes that are formed in accordance with the process of the present invention may be allowed to remain in the silicone fluid of the present invention without detracting to a large extent from the advantages of the silicone polymer fluid of the present invention as a brake fluid. The resulting silicone polymer fluid when cooled to room temperature has a viscosity of 2 to 400 centistokes at 25° C. and more preferably 7 to 20 centistokes at 25° C. Such a silicone fluid is a mixture of polymers having 2 to 2000 silicon atoms in the polymer with the average polymer having 20 to 40 silicon atoms.

In the most preferred embodiment of the above process there is used 85 weight percent of organohalosilanes of the formula $R_2SiX_2$ and 15 weight percent based on the total weight of the organohalosilanes of organohalosilanes of the formula RSiX$_3$. To this mixture there is added sufficient water to hydrolyze 25 mole percent of the chlorine atoms present. The other chlorine atoms on the silicones are substituted by the alcohol moieties. There will be obtained a silicone polymer fluid containing 20 to 48 weight percent of the MO or the hydrocarbonoxytype groups based on the total weight of fluid. Such a silicone polymer fluid is extremely compatible with most silicone fluids useful as brake fluids and most non-silicone brake fluids and other types of hydraulic fluids.

In the more general embodiment of the present invention, there is added sufficient water in the hydrolysis procedure so that there may be present in the final silicone fluid polymer 5 mole percent to 100 mole percent of hydrocarbonoxy type of groups, that is, MO groups, based on the total molar amount of substituent groups present in the silicone polymer.

The critical phase of producing this copolymer fluid is the amount of water that is used based on the amount of the organohalosilanes, so that only the desired amount of siloxane bonds are formed. The chlorine atoms that remain on the hydrolyzed silicone polymer will, of course, be substituted by the alcohol moieties when the alcohol is added to the halogen containing silicone polymer. Thus, the amount of water that is used in the hydrolysis not only controls the molecular weight of the final polymer and thus its viscosity but further, in addition, controls the amount of hydrocarbonoxy groups that will be present on the silicone fluid polymer.

In the preferred case where the organohalosilane mixture contains only R$_2$SiX$_2$ silanes and RSiX$_3$ silanes, then it is preferred to use 0 to 0.93 moles of water per mole of R$_2$SiX$_2$ present in the organohalosilane mixture and 0 to 1.4 moles of water per mole of RSiX$_3$ in the organohalosilane mixture. In the most preferred embodiment there is used 85 weight percent of the formula R$_2$SiX$_2$ and 15 weight percent of the organohalosilane of the formula RSiX$_3$, where X stands for chlorine and there is added to this mixture 0.8 moles of water per mole of the mixture so as to hydrolyze and form siloxane bonds of 75 mole percent of the chlorine atoms on the silanes. The rest of the chlorine atoms are substituted by the hydrocarbonoxy-type of moieties.

The composition comprised of the MDT fluid base polymer and the hydrocarbonoxy copolymer siloxane additive described above produces a satisfactory hydraulic fluid. However, optional additive can be utilized to provide beneficial properties to the fluid. Thus, in the hydraulic brake systems of automobiles it is desirable that the brake fluid swell the rubber and the rubber parts that are part of that hydraulic brake system by 0.1 to 2%, so that by such swelling of the rubber parts more efficient seals will be formed by such rubber parts. It has been found that in some cases silicone fluids do not have the desired swelling effect on various types of rubbers that are used in hydraulic brake systems of automobiles. Accordingly, it may be desired to add a rubber swell additive to the hydraulic fluid mixture. It should be pointed out that where the polysiloxane copolymers identified above have ester or amine functionality, that such polysiloxanes will swell the rubber parts in the hydraulic brake system sufficiently so that proper seals are formed. This is true when such polysiloxanes are present at a concentration of 5% by weight or more in the hydraulic fluid mixture. It should be pointed out that the glycol based polyethers also act both as water tolerance additives and as rubber swell additives.

Thus, based on the weight of the total hydraulic fluid mixture there is preferably added to 1 to 5% by weight of rubber swell additives selected from the class consisting of organic solvents, esters of the formula,

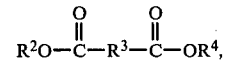

and esters of the formula,

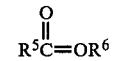

wherein R$^2$ and R$^4$ are selected from the class consisting of monovalent hydrocarbon radicals and halogenated monovalent hydrocarbon radicals of 4 to 15 carbon atoms and are preferably alkyl radicals of 4 to 15 carbon atoms and R$^5$ and R$^6$ are defined as R$^2$, and R$^4$ and R$^3$ is selected from divalent hydrocarbon radicals and halogentated divalent hydrocarbon radicals of 5 to 12 carbon atoms. Preferably, R$^3$ is an alkylene radical of 5 to 12 carbon atoms.

The organic solvents which may be used as rubber swell additives are such inert organic solvents as, mineral spirits, xylene, toluene and low molecular weight hydrocarbon fractions. However, such solvents are not generally preferred and the esters indicated above are the more preferred rubber swell additives. Within the scope of the rubber swell additives indicated above the most preferred are dioctyl azelate, dioctyl adipate and dioctyl sebacate. Thus, it is preferred that these rubber swell additives be added at a concentration of 1 to 5% by weight of the total hydraulic fluid mixture so as to impart the proper rubber swell properties to the hydraulic fluid mixture.

A combination of rubber swell additives which is particularly affective is comprised of a mixture of dioctyl azelate and tributyl phosphate.

It may also be desirable to add to the silicone fluid at a concentration of 0.05 to 2% by weight of the total hydraulic fluid, an anti-corrosion additive selected from the class consisting of the zinc salts of naphthenic acid and a compound of the formula,

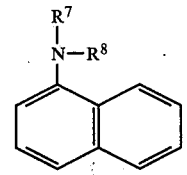

wherein R$^7$ is selected from the class consisting of hydrogen and lower alkyl radicals of 1 to 8 carbon atoms and R$^8$ is selected from the class consisting of aryl radicals, alkylaryl radicals and halogenated aryl radicals and is preferably phenyl. More specific anti-corrosion additives are such compounds as phenyl-naphthylamine and nonylphenylacetic acid and such proprietary products as duPont's formulation RP-2 and Ortholium manufactured by E. I. duPont deNemours & Co.

In addition, there may be used at a concentration of 1 to 5% by weight of the total hydraulic fluid mixture of an antioxidant compound selected from the class consisting of

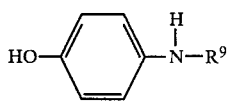

and

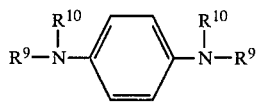

where $R^{10}$ is selected from the class consisting of hydrogen, monovalent hydrocarbon radicals and halogenated monovalent hydrocarbon radicals and is more preferably selected from hydrogen and lower alkyl radicals of 1 to 8 carbon atoms, $R^9$ is selected from the class consisting of monovalent hydrocarbon radicals and halogenated monovalent hydrocarbon radicals and is more preferably a lower alkyl radical of 1 to 8 carbon atoms, wherein in the above formulas of the phenyl anti-oxidant compounds it is most preferred that $R^{10}$ be hydrogen or methyl and $R^9$ be methyl. In addition, there may be used as an anti-corrosion additive at a concentration of 0.01 to 2% by weight of the total hydraulic fluid a hydrogen polysiloxane of the formula,

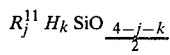

wherein the above formula $R^{11}$ is selected from lower alkyl radicals having 1 to 8 carbon atoms, j is a number that varies from 1.11 to 2.02, k is a number that varies from 0.023 to 1.00, and the sum of j+k varies from 2.024 to 3.00. Thus, as indicated above, there may be added to the silicone fluid, various types of rubber swell additives, anti-corrosion additives and anti-oxidant additives either alone or in combination with each other, so as to enhance the resulting properties of the hydraulic silicone fluid when it is used in the hydraulic system and particularly in a brake hydraulic system of an automobile. It can be appreciated that there are many other types of anti-oxidant additives and rubber swell additives that may be added to the silicone fluid so as to enhance the properties of the resulting hydraulic silicone fluid mixture. The compounds that have been mentioned above are only the most preferred compounds. Only the most preferred additives have been indicated above so as to not unduly burden the present application with information that is unnecessary to a skilled worker in the art. Any known rubber swell additive and any known antioxidant additives may be added to the silicone fluid of the present invention if such additives are compatible with the silicone fluids. It can also be appreciated that the rubber swell additives and the anticorrosion additives may be added either alone or in combination to the silicone fluid. It can also be appreciated that there is within the scope of the present invention a hydraulic silicone fluid mixture which comprises the silicone fluid either alone or in a combination with the anti-oxidant additive, anti-corrosion additives and rubber swell additives, which additives again may be added alone or in combination with each other. Thus, in the particular hydraulic fluid mixture within the present invention there may be used in addition to the silicone fluid any combination of the above ingredients.

There may be added to the linear silicone fluid of formula (1), other classes of additives such as, buffering agents and etc., which are also within the scope of the present invention so as to result in a hydraulic fluid that has enhanced properties in a particular area.

EXAMPLE 1

The MDT silicone base polymer was obtained by equilibrating octamethyl cyclotetrasiloxane with a polymethylsiloxane fluid having approximately 7% trifunctionality. Sufficient chain-stopper is utilized to produce an oil of approximatley 30 centistokes. To 92 parts of this base fluid was added 1 part of the hydrocarbonoxy functional silicone additive to produce the novel hydraulic fluid of the present invention. The additive was produced in the following manner:

Into a clean, dry resin hydrolyzer were charged 100 parts of dimethyl-dichlorosilane and 15.5 parts methyl-trichlorosilane, whereupon agitation was commenced. Slowly, 13.4 parts water were added to the silane blend. Since the reaction is endothermic, the temperature drops as HCl evolves. The HCl exhausted with a scrubber, however, no vacuum was used in order to preserve the silanes and avoid disrupting the silane balance. The water was continuously fed in order to maintain the batch temperature at approximately 0° to 5° C. After the water had been fed to the system moderate heat was applied to drive off remaining HCl. Heating was continued 70° C. for 10 minutes. Next, 77.2 parts of methoxy-ethoxy-ethoxy-ethanol (MEEE) were charged to the reactor. The alkoxylation reaction proceeded as long as the batch temperature was 60° or greater. The reaction was mildly exothermic and additional evolved HCl can be scrubbed off. When all of the MEEE had been added, the mixture was heated to reflux under a mild vacuum to drive off any residual acid. If there is less than 0.1% HCl present, the reaction may proceed. If greater than 0.1% HCl is present, the mixture can be treated with approximately 6.7 parts of alcohol, whereupon reflux is continued for 2 hours. At that time the alcohol is stripped and a sample can be retested for acid content. When the acid content was satisfactory, approximately 10 parts of ammonia were charged to the mixture under a kettle pressure of 3 to 5 psi for 10 minutes. Residual NH₃ pressure was then vented off and the reactor batch was again subjected to a vacuum and a temperature of approximately 205° to 215° C. in order to strip off the light ends. Heating was continued for 15 minutes whereupon the batch was cooled to less than 60° C. The batch can then be filtered and treated with Celite, ½% Fuller's Earth and 0.1% carbon black to remove discoloration.

EXAMPLE 2

To 100 parts by weight of the silicone hydraulic brake fluid of Example 1 was added 3.5 parts tributyl phosphate, 3.0 parts di-2-ethylhexyl azelate, 0.004 parts oil violet IRS and 0.008 parts perox red. A purplish brake fluid having satisfactory rubber swell properties was thereby produced.

The silicone fluid prepared in accordance with Example 2 was tested in various brake fluid tests as to determine its suitability or superiority as a brake fluid.

One test that may be used is a dry equilibrium reflux boiling test which is carried out by placing 60 millimeters of the hydraulic fluid in a flask and boiling under specified equilibrium conditions in a 100 millimeter flask. The average temperature of the boiling fluid at the end of the reflux period is determined and corrected for variations of barometric pressure where necessary and the final value is its equilibrium reflux boiling point. The hydraulic fluid of Example 2 when tested for its equilibrium reflux boiling point had a value of greater than 500° F.

A wet equilibrium reflux boiling test was carried out wherein the hydraulic fluid of Example 2 had 10% by weight water added to it with 0.1% three normal hydrochloric acid. Infrared spectra showed the appearance of a large OH bond, no water band and a slight increase in polymer length and a silanol content. When tested for its wet equilibrium boiling point it was found that the fluid of Example 2 with this large amount of water in it had a wet equilibrium boiling point above 500° C. A typical glycol fluid with this much water in it had a wet equilibrium boiling point of 105° C., thus, indicating the superiority of the silicone fluid of the present invention in maintaining its high boiling point and being compatable with a large amount of water while still maintaining a high temperature stability and a high boiling point. The water is prevented from being boiled out of the silicone fluid and thus forming a vapor lock in hydraulic lines as is possible with a glycol based fluid.

The corrosion test comprises polishing, cleaning and weighing 6 specified metal corrosion test strips and assemblying them as prescribed in the standards. This assembly is placed on a standard rubber wheel cylinder cup in the corrosion jar and immersed in the brake fluid, capped and placed in an oven at 100° C. for 120 hours. Upon removing and cooling the jar, the strips in the fluid cup are examined and tested. The metal test strips are observed to note whether there are any crystalline deposits which form and adhere to the glass jar walls or the surface of the metal strips and whether there is sedimentation in the fluid water mixture. The metal strips are weighted for weight loss and other determinations are made with respect to them. Thus, in the results of this test in terms of the metal weight loss, the steel strip suffered a loss of 0.01 milligrams/cm$^2$, the aluminum strip suffered a loss of 0.01 milligrams/cm$^2$, the brass strip suffered a loss of 0.01 milligrams/cm$^2$, the copper strip suffered a loss of 0.01 milligrams/cm$^2$, the iron strip suffered no loss. There was no gelling of the fluid at the high temperature and no gelling of the fluid at low temperatures of 23±5° C. There were no deposits in the fluid and the sediment that was weighted was less than 0.1 weight percent of the fluid. The pH of the fluid after the test was between 7 to 11.

The next test is the effect on rubber where four selected styrene butadiene rubber cups are measured and their hardness determined. This test is known as the Rubber Swell Test J-1703. In this test the cups are placed two to a jar and are immersed in the hydraulic fluid of Example 2. One jar is heated for 120 hours at 70° C. and the other for 70 hours at 120° C. After this, the cups are removed, washed and examined for disintegration. They are remeasured and their hardness redetermined. The fluid was found to have satisfactory rubber swell properties.

In the fluid appearance at low temperature test the test comprises taking the hydraulic fluid of Example 2 and lowering it to expected minimum exposure temperatures such as −40° C. and then the fluid is then observed for clarity, gellation, sedimentation, excessive viscosity of thixotropity. The hydraulic fluid of Example 2 with 3.5% of water in it has no crystallization, cloudiness or sedimentation at −40° C., and upon inversion of the sample bottle in which the test is carried out, the time required for the air bubble to travel to the top of the fluid is 1 second.

In the water tolerance test the hydraulic fluid is diluted so that there is 3.5% by water in the fluid and it is stored at low temperatures of −40° to −50° C. for 24 hours. The cold water wet fluid is first examined for clarity, stratification, sedimentation and placed in an oven at 60° C. for 24 hours. Then it is removed and again examined for stratification and sedimentation. The hydraulic fluid of Example 2 when subjected to this test, was clear and there was no stratification of sedimentation. Further, even after being placed in an oven at 60° C. for 24 hours, there is again no stratification and no sedimentation.

The tests that have been discussed in detail above are the particular tests for brake fluids which show advantages and superior properties of the hydraulic fluid of Example 2 and more generally the hydraulic fluid of the present invention as a brake fluid.

The above examples were given for the purpose of illustrating the advantages of the hydraulic fluid mixtures of the present invention over conventional hydraulic fluids and more particularly over conventional brake fluids. It is not intended in any way or manner by these examples to limit the application of the hydraulic silicone fluid mixtures defined in this application solely for use as a brake fluid in an automotive system or as a brake fluid in any other type of vehicle system. Generally, as has been stated previously, the hydraulic silicone fluid mixture as defined in the present specification, may be used in any type of hydraulic system including any type of hydraulic brake system of any type of vehicle.

What is claimed as new and desired to be protected by Letters Patent of the United States is:

1. A silicone fluid useful as a hydraulic fluid comprising a mixture of
   (a) 100 parts by weight of a silicone base polymer having, approximately, 3 to 20 mole percent of polymeric units having the formula $R_3SiO_{\frac{1}{2}}$, 1.5 to 20 mole percent of polymeric units having the formula $RSiO_{1.5}$, and 60 to 95 mole percent of polymeric units having the formula $R_2SiO$, and a viscosity of approximately 1 to 200 centistokes at 25° C., and
   (b) approximately 0.5 to 5.0 parts by weight of a dialkylalkoxysilyl chain-stopped polydialkylsiloxane fluid comprising 10 to 60 mole percent of polymeric units having the formula $$\begin{matrix} & M \\ & | \\ & O \\ & | \\ & R_2SiO_{\frac{1}{2}} \end{matrix}$$

and 40 to 90 mole percent $R_2SiO$ units and having a viscosity of approximately 10 to 50 centistokes at 25° C.; wherein R represents the same or different monovalent hydrocarbon radical, M is selected from the class consisting of R—, ROR'—, ROR'OR'—, $R(OC_xH_{2x})_n$—, and

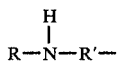

such that R is as previously described, R' is selected from the class consisting of alkylene and arylene radicals having up to 20 carbon atoms, x varies from 2 to 4 and n varies from 4 to 100.

2. A silicone fluid as in claim 1, further comprising, approximately, 2 to 15 parts by weight of a rubber swell additive or mixture of said additives.

3. A silicone fluid as in claim 2, wherein there is present, approximately, 1 to 7.5 parts by weight tributyl phosphate and 1 to 7.5 parts dioctyl azelate.

4. A silicone fluid as in claim 1, further comprising an amount of dye effective for rendering said silicone fluid purple in color.

5. A silicone fluid as in claim 4, wherein said dye is a mixture of oil violet IRS and Perox red.

6. A silicone fluid as in claim 1, wherein said silicone base polymer has, approximately, 10 to 15 mole percent $R_3SiO_{\frac{1}{2}}$ units, and 2 to 6 mole percent $RSiO_{1.5}$ units, where R represents radicals selected from methyl and ethyl radicals.

7. A silicone fluid as in claim 1, wherein said alkoxy chain-stopped siloxane fluid is further comprised of up to 25 mole percent of polymeric units selected from the class consisting of

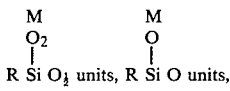

and $RSiO_{3/2}$ units and mixtures thereof, and having a viscosity of, approximately, 2 to 400 centistokes at 25° C.

8. A silicone fluid as in claim 1, wherein said alkoxy chain-stopped siloxane fluid is dimethyl-methoxy triglycol chain-stopped polydimethylsiloxane.

9. A process for transmitting force through a hydraulic brake system having hydraulic activating means, hydraulic activated means and hydraulic line means connecting said hydraulic activating means with said hydraulic activated means comprising substantially filling said hydraulic activating means, said hydraulic activated means and said hydraulic lines with a hydraulic silicone fluid mixture having acceptable water tolerance comprising
    (a) 100 parts by weight of a silicone base polymer having, approximately, 3 to 20 mole percent of polymeric units having the formula $R_3SiO_{\frac{1}{2}}$, 1.5 to 20 mole percent of polymeric units having the formula $RSiO_{1.5}$, and 60 to 95 mole percent of polymeric units having the formula $R_2SiO$, and a viscosity of, approximately, 1 to 200 centistokes at 25° C., and
    (b) approximately 0.5 to 5.0 parts by weight of a dialkylalkoxysilyl chain-stopped polydialkylsiloxane fluid having 10 to 60 mole percent of polymeric units having the formula

and 40 to 90 mole percent $R_2SiO$ units and having a viscosity of, approximately, 10 to 50 centistokes at 25° C.; wherein R represents the same or different monovalent hydrocarbon radical, M is selected from the class consisting of R—, ROR'—, ROR'OR'—, $R(OC_xH_{2x})_n$—, and

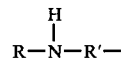

such that R is as previously described, R' selected from the class consisting of alkylene and arylene radicals having up to 20 carbon atoms, x varies from 2 to 4 and n varies from 4 to 100.

10. A process as in claim 9, wherein said hydraulic silicone fluid is comprised of, approximately, 2 to 15 parts by weight of a rubber swell additive or mixture of said additives.

11. A process as in claim 10, wherein there is present 1 to 7.5 parts by weight tributyl phosphate and 1 to 7.5 parts by weight dioctyl azelate.

12. A process as in claim 9, wherein said fluid is further comprised of an amount of dye effective for rendering said silicone fluid purple in color.

13. A process as in claim 12, wherein said dye is a mixture of oil Violet IRS and Perox red.

14. A process as in claim 9 wherein said alkoxy chain-stopped siloxane fluid is further comprised of up to 25 mole percent of polymeric units selected from the class consisting of

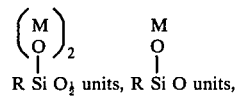

and $RSiO_{3/2}$ units and mixtures thereof, and having a viscosity of, approximately, 2 to 400 centistokes at 25° C.

15. A process as in claim 9, wherein said alkoxy chain-stopped siloxane fluid is dimethyl-methoxy triglycol chain-stopped polydimethylsiloxane.

* * * * *